United States Patent [19]
Walton

[11] Patent Number: 5,353,743
[45] Date of Patent: * Oct. 11, 1994

[54] URINE COLLECTION DEVICE FOR PET ANIMALS

[76] Inventor: Robert W. Walton, 4 Chapel St. South, Thorold, Ontario, Canada, L2V 3Y7

[ * ] Notice: The portion of the term of this patent subsequent to Mar. 16, 2010 has been disclaimed.

[21] Appl. No.: 25,126

[22] Filed: Mar. 2, 1993

Related U.S. Application Data

[63] Continuation-in-part of Ser. No. 793,126, Nov. 18, 1991, Pat. No. 5,193,488.

[51] Int. Cl.⁵ .............................................. A01K 1/01
[52] U.S. Cl. .................................... 119/166; 119/165
[58] Field of Search ............... 119/161, 162, 163, 164, 119/165, 166, 167, 168, 169, 170

[56] References Cited

U.S. PATENT DOCUMENTS

| | | | |
|---|---|---|---|
| 4,444,148 | 4/1984 | Lauder | 119/161 |
| 4,627,383 | 12/1986 | Metzger | 119/161 |
| 4,649,578 | 3/1987 | Vargo | 119/161 |
| 5,184,574 | 2/1993 | Kirk et al. | 119/166 |

FOREIGN PATENT DOCUMENTS

| | | | |
|---|---|---|---|
| 259293 | 3/1988 | European Pat. Off. | 119/166 |
| 331219 | 9/1989 | European Pat. Off. | 119/161 |
| 8102536 | 12/1982 | Netherlands | 119/166 |

*Primary Examiner*—John G. Weiss
*Attorney, Agent, or Firm*—Wallace F. Neyerlin

[57] ABSTRACT

A urine collection device to assist in the maintenance and monitoring of the health of pets through urine analysis is taught consisting primarily of a large rectangular collection tray with a hole in its center and grooves sloping to the hole; a round sample collection cup which is placed under the hole in the collection tray; and a liquid tight lid for the cup. These three items are coordinated to be utilized in connection with a cat waste elimination system having a substantially rectangular top tray compartment and a substantially rectangular bottom tray assembly.

9 Claims, 7 Drawing Sheets

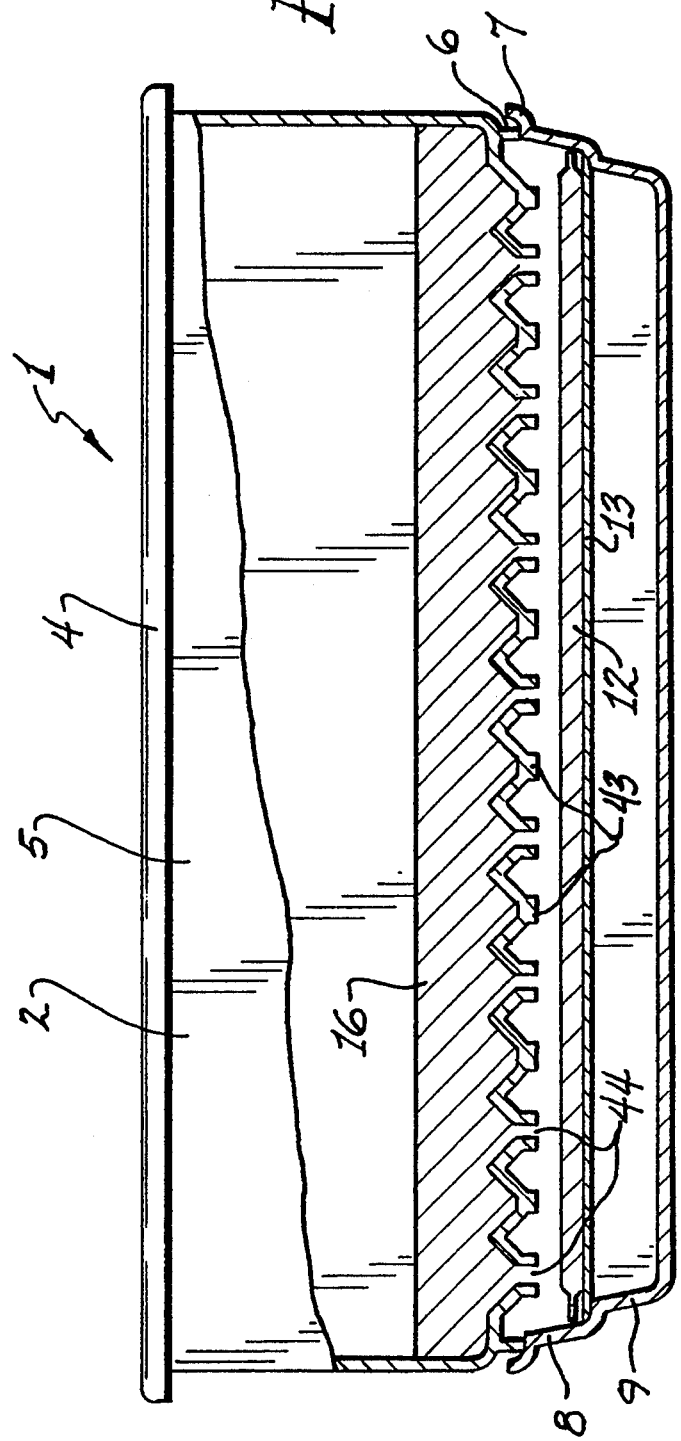

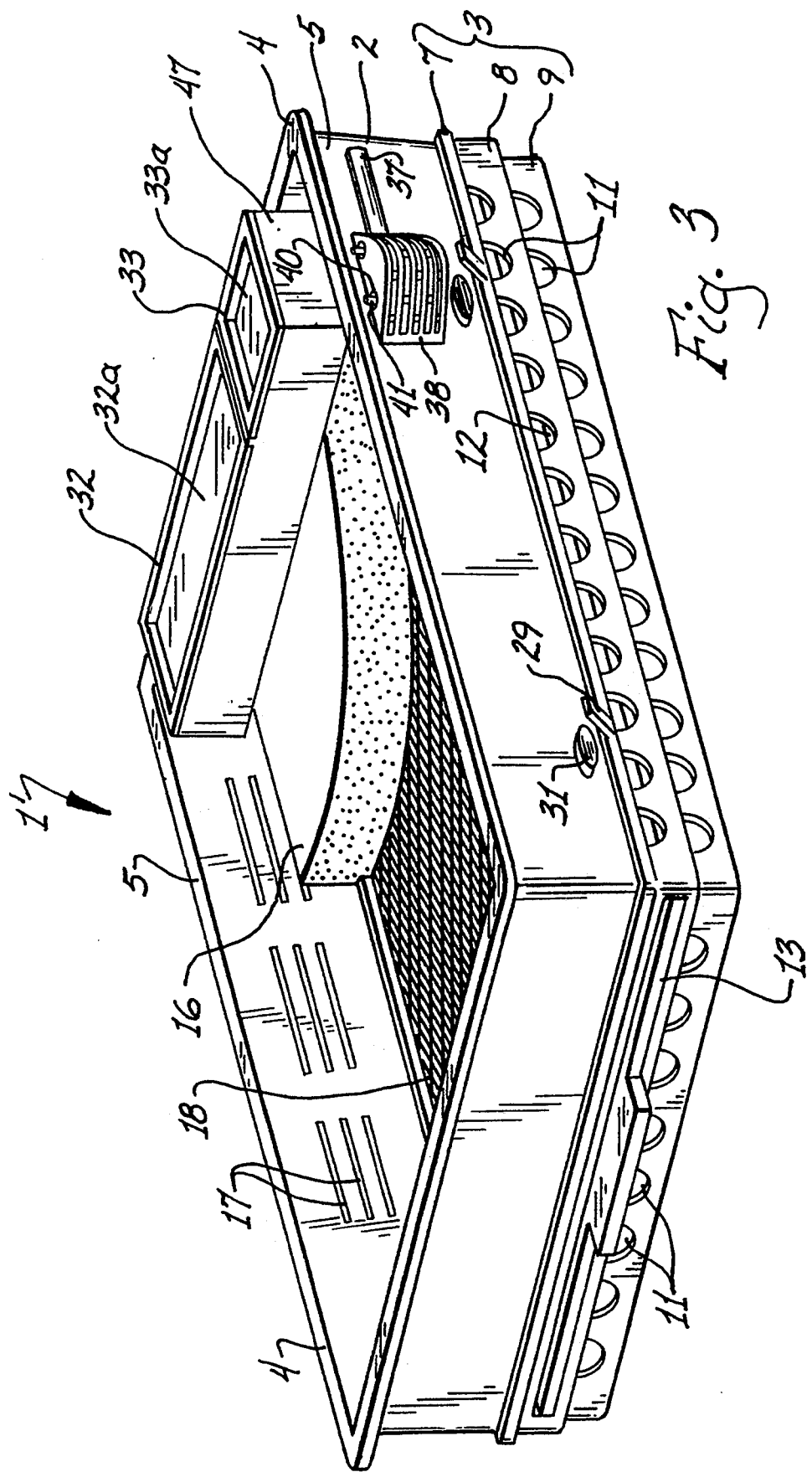

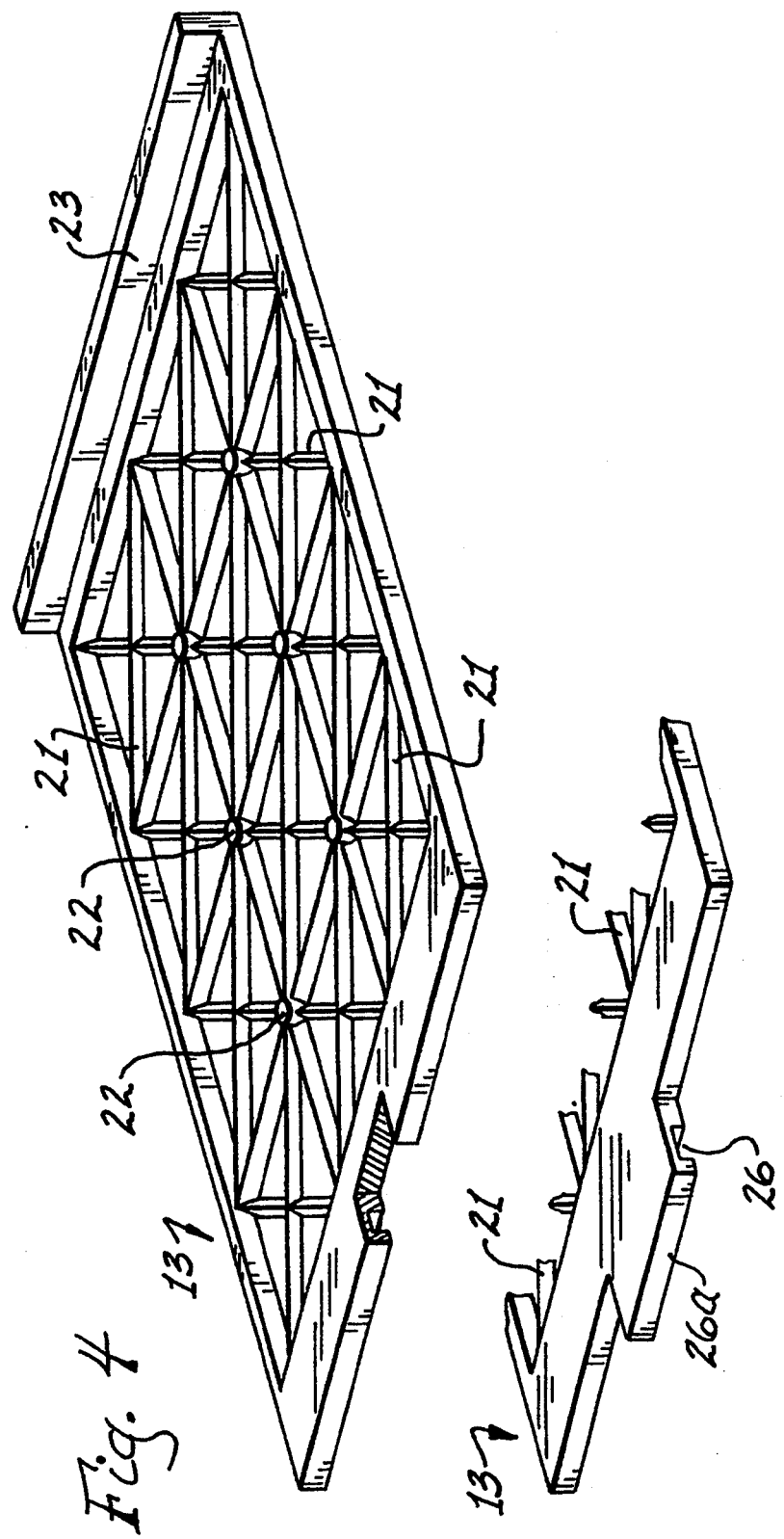

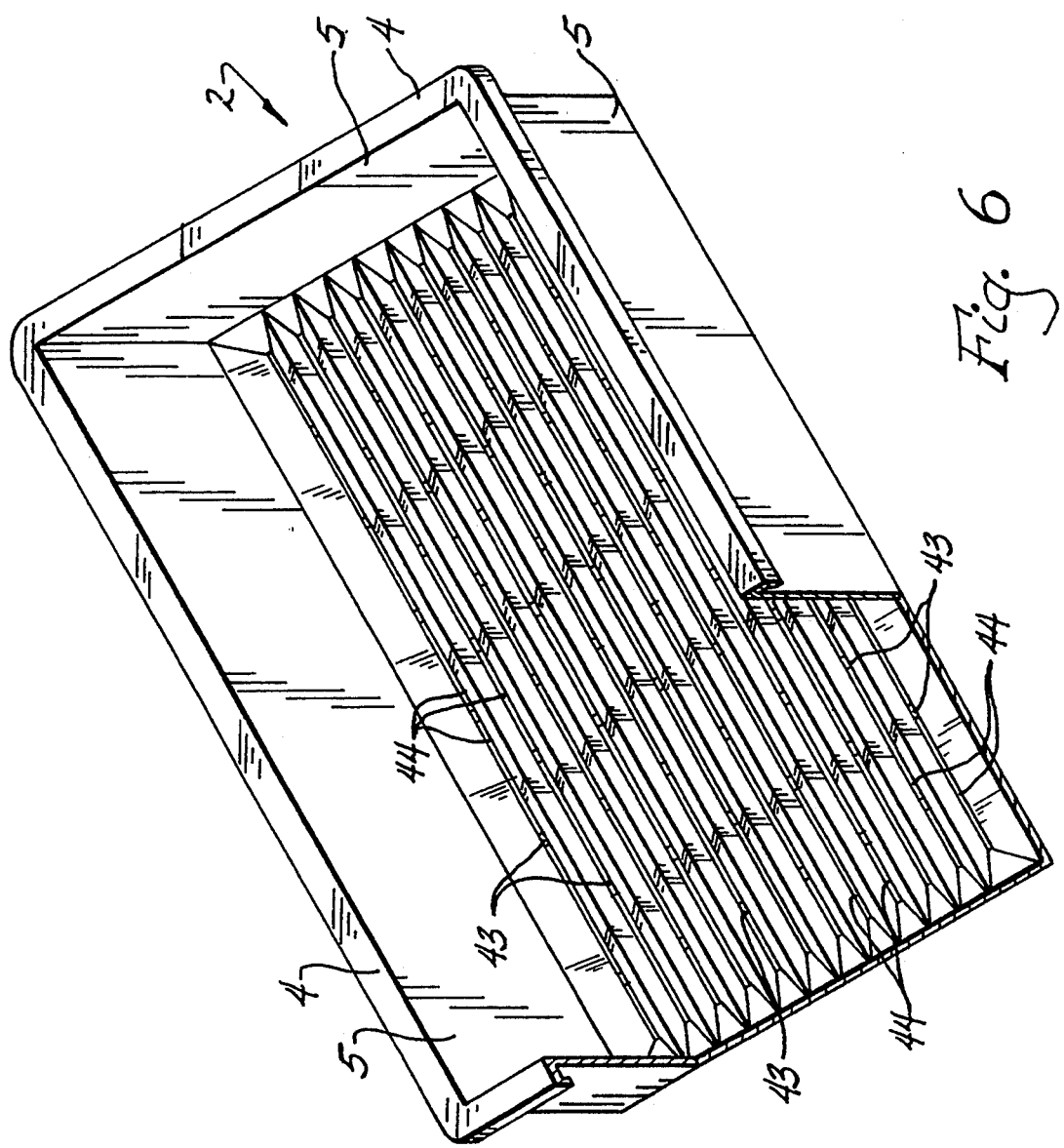

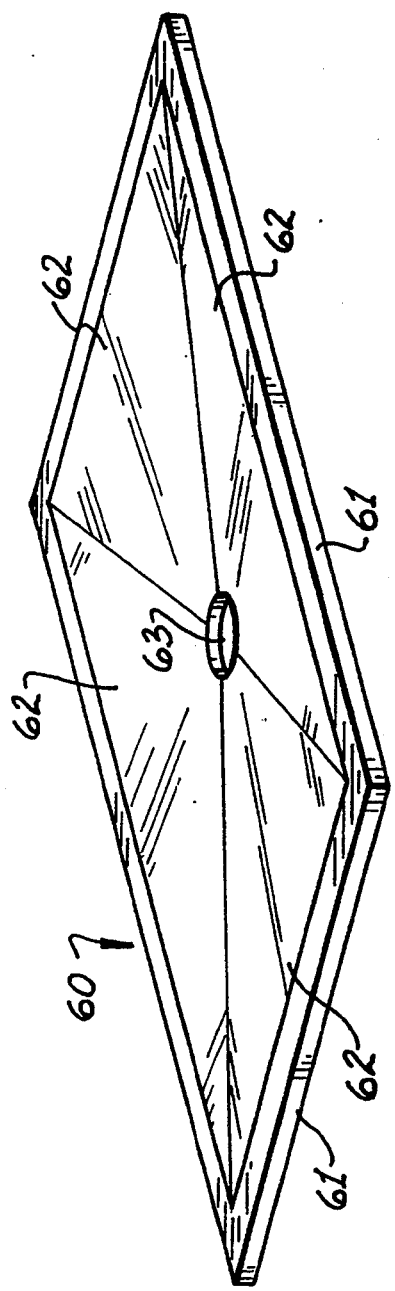
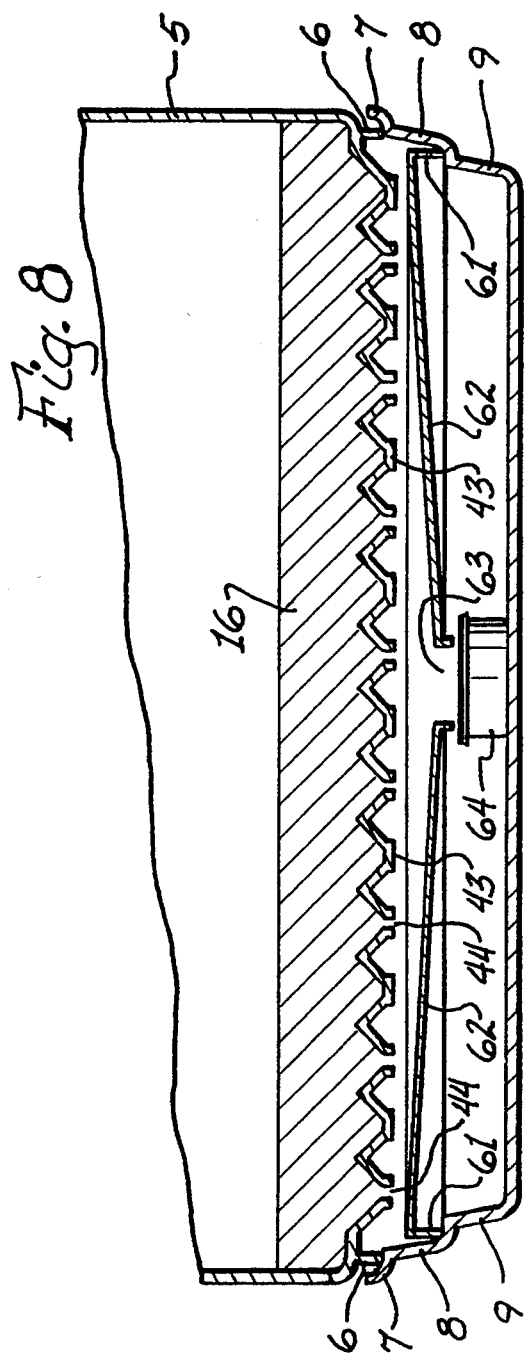

2

URINE COLLECTION DEVICE FOR PET ANIMALS

This application is a Continuation-in-part of my prior Patent Application entitled "Cat Waste Elimination System," Ser. No. 07/793,126, filed Nov. 18, 1991, and issued Mar. 16, 1993 as U.S. Pat. No. 5,193,448.

FIELD OF THE INVENTION

Considerable information about the general health and well-being of pets, e.g. cats, can be obtained from performing a simple test on a fresh urine sample. As well as alerting the pet's owner to many specific diseases, the test may also allow the regular monitoring of many ongoing medical conditions that may already be present. With the device of the present invention, a simple, economical urine test may be performed at home which may provide the owner with invaluable medical information about his cat's current health status. Since the pet owner can alert the veterinarian immediately if any part of the test is abnormal, underlying or previously undetected problems that may have gone unnoticed can also be found, thereby alleviating potential unnecessary pain or discomfort for the pet or cat.

BACKGROUND OF THE INVENTION

This invention came about to satisfy the need of pet owners and veterinarians to assist in the maintenance and monitoring of health of pets through urine analysis.

This invention provides an easy and simple solution to the collection of urine and directs it to a germ free container for either instant analysis through the use of test strips or the complete containment of a sample to be sent to a medical testing lab.

The urine collection device of this invention has primary usage in the dry cat waste elimination system described and claimed in my prior patent application referred to above, and can be used by the pet owner in the confines of his home or by the professional veterinarian at his hospital with equal ease. If used by the pet owner it will allow a continuous periodic check of at least 5 of the most common animal conditions that are monitored:

1. P H level
2. Glucose
3. Protein
4. Ketones
5. Bilirubin

SUMMARY OF THE INVENTION

The urine collection device primarily consists of three parts for the collection of animal urine, which urine can then be tested for conditions such as referred to above with medical test strips or sticks known to the art (such as the reagent strips for urinalysis sold by Miles Canada Inc. under the trademark "Multistix").

The three parts are: a large rectangular urine collection tray which has a hole in the center and grooves sloping to the hole: a round urine sample collection container which is placed under the hole in the tray; and a liquid tight lid for the container so as to make it easily transportable without spillage.

The size of the collection tray is coordinated with the dimensions of the cat waste elimination system described in my prior application. Its typical dimensions are eighteen inches by twelve and one-half inches and a typical size of the hole in the center is 1 and 15/16 inches in diameter.

BRIEF DESCRIPTION OF THE DRAWINGS

FIG. 2 is a transverse sectional view of the assembly of FIG. 1;

FIG. 3 is a perspective view of another entire assembly, less preferred alternate embodiment of my prior co-pending application;

FIG. 4 is a perspective view of a drawer tray employed in the bottom tray assembly to support the absorbent tablet of the cat waste elimination system of my prior co-pending application;

FIG. 5 is a drawing showing a preferred end for the tray of FIG. 4;

FIG. 6 is a perspective view of the bottom design of the top tray compartment employed in the assembly of FIGS. 1 and 2 in the invention of my prior application and which preferably is also employed in carrying out the invention of this application;

FIG. 7 is a perspective view of a urine collection tray employed in the invention of the present application;

FIG. 8 is a transverse sectional view (partial) of the tray and urine collection cup as utilized in conjunction with the assembly of FIG. 1;

DETAILED DESCRIPTION OF THE DRAWINGS

Figure 1:
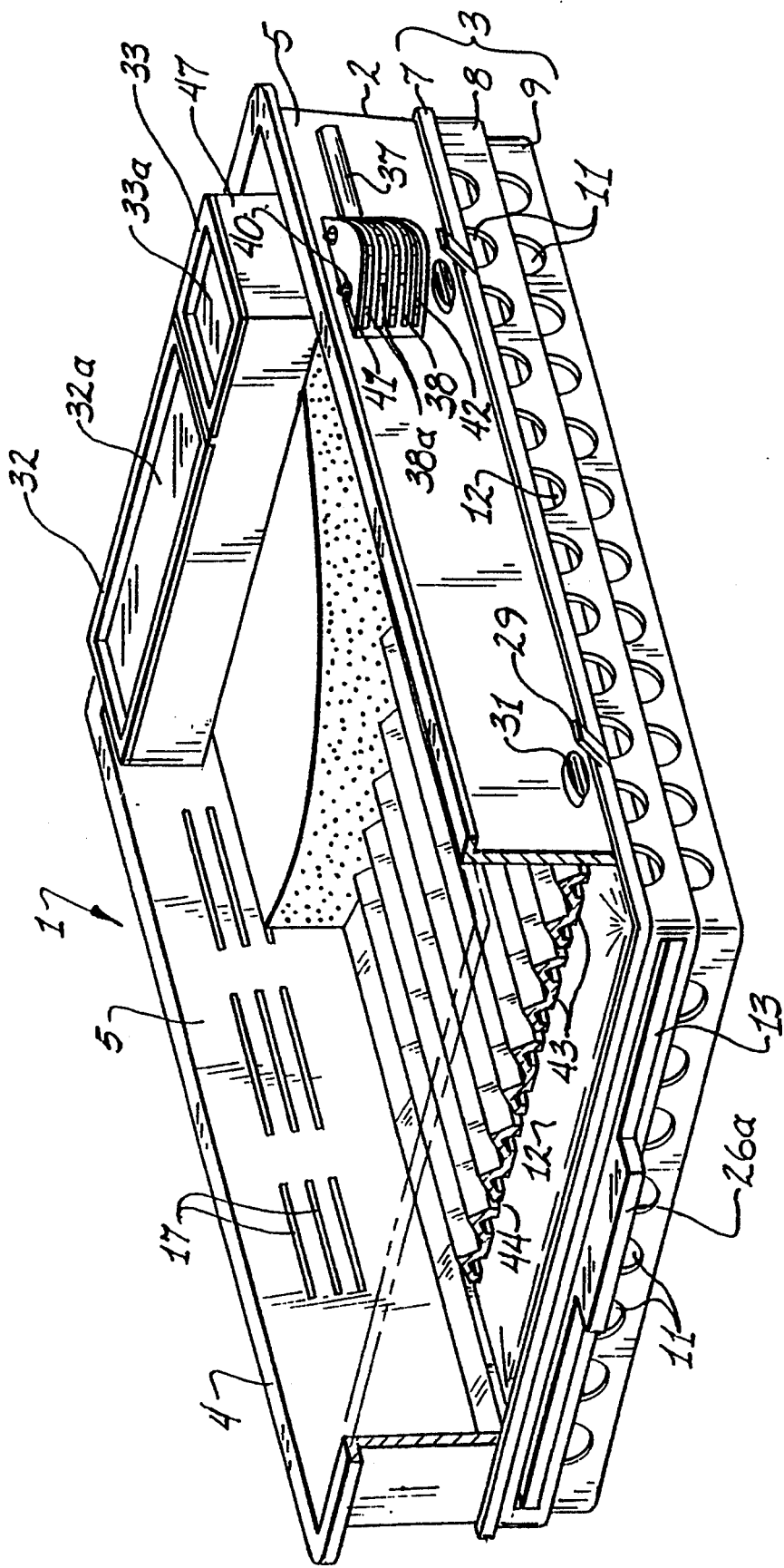
FIG. 1 is a perspective view of the preferred embodiment of the entire assembly of the cat waste elimination system of my prior co-pending application.

In the drawings the entire preferred assembly of the prior application (rectangular in shape preferred) is designated by the numeral 1 (by the numeral 1' in the less preferred embodiment of FIG. 3 et al). The entire assembly includes an upper or top tray compartment 2 and a bottom or lower tray assembly compartment 3. The upper tray compartment possesses a circumferential lip 4 all around its perimeter and a rim or legs 6 which separates the upper tray compartment 2 from the lower tray assembly 3. The upper tray possesses sides 5 around same which sides are almost but not quite vertical. The upper tray or box will typically have dimensions of 14"×20"−22"×5½", and has several unique features: a pervious bottom to allow direct filtration of the cat's urine; a retardant spill ring on the inside to keep the sand or gravel or granular material inside the box; and litter indicator rings or depth markers 17 for the correct balance of particulate material to be put in the box. It preferably also possesses several points of connection on the box for additional accessories. The lower assembly compartment 3 is a holder of the tray 13 that holds the liner pad or tablet 12 in the prior application. In the invention of the present application the lower assembly compartment holds the urine collection tray 60 of FIG. 7. This lower assembly compartment 3 has approximately 64 aeration holes or openings 11 in the sides and ends which match up in upper and lower sections of the bottom compartment. The purpose of these holes is to allow the liner or tablet to receive aeration and in doing so Lo dry the urine out of the liner used in the prior application, allowing the liner to be re-used several times over. This bottom tray assembly compartment is preferably plastic pressure clip fastened to the upper "flow-through" main tray but may be connected to same in any suitable manner.

FIG. 1 illustrates an embodiment where at the end shown only the lower section 9 of the bottom compartment contains aeration holes 11; whereas at the side shown, both the upper (8) and lower (9) sections of the bottom compartment contain aeration openings which match up vertically. FIG. 1 illustrates 32 such aeration holes, 24 in the side shown and 8 at the end shown, thus indicating that the opposite side and end also possess 32 aeration holes so as to account for the total of 64 aeration openings referred to above. Although aeration openings on each of the sides and each of the ends are preferred for maximum aeration and drying effects, it is also obvious that the invention can be carried out with less preferred results where only one end of the bottom tray assembly possesses such aeration openings.

There is also a drawer-like tray 13 that fits into the bottom assembly compartment 3 which bottom compartment 3 is clipped or fastened to the upper compartment 2 and which tray is for the purpose of supporting liner tablet 12. (As previously indicated, this tray 13 is replaced by a urine collection tray 60 in the present invention). This tray 13 is removable for the purpose of simplicity of removing the urine collecting liner tablet. The lower assembly compartment 3 is preferably of only one-piece construction but comprises an upper section 7, a middle section 8 and a bottom section 9, the holes 11 in sections 8 and 9 being in vertical alignment preferably all around the perimeter of the assembly and/or at two sides and one end thereof.

All three parts, top compartment 2, the bottom compartment 3 and the drawer tray 13 make up to main pet waste elimination system construction of my prior invention, all of which are typically made of rigid plastic. The drawer 13 is designed with a lip around the inside to sustain the support of the urine tablet liner 12. The drawer tray also has six small pillars 22 which line up with "buttons" 25 of the liner and which further support the liner 12 so as to allow for a pattern of equal squares on the tablet or liner for support. As aforesaid, the upper section of lower compartment 3 is designated by the numeral 7, the center section by 8 and the bottom section by 9. The sections 8 and 9, and the drawer tray 13 which is slidably contained within center section 8, are structurally coordinated and designed so that the vertically aligned holes 11 provide ample aeration both to the top and bottom of the liner pad; which holes (for ease of manufacturing purposes using commercial plastic forming techniques and procedures which are the most competitive economically,) are typically semi-circular in shape as shown in FIG. 1. In carrying out the present invention, the urine collection tray 60 of FIG. 7 is substituted in place of the drawer tray 13 of my prior invention.

As taught in my prior application, the sides of upper section 7 of lower compartment 3 possess slots to facilitate entry of locking tabs into same. Locking tabs are located in the sides of legs of upper tray 2. The tabs may be provided with unlocking levers to facilitate easy disassembly of the trays. Such levers may also be provided with stiffening webs for structural strength and product longevity.

The bottom of top compartment 2 may also be reinforced with support straps which run longitudinally and transversely, similar to the tray grid 21 illustrated in FIG. 4. Screen 18 of FIG. 34 spans across most of the interior bottom of top compartment 2 except at slanting drip edge portions around the perimeter of same. Sand and/or gravel and/or kitty litter material 16 is supported by the screen and the amount of same used and/or desired for use is ascertainable by depth marker lines 17 in the interior sides of upper compartment 2. Drawer tray 13 for the absorbent liner or pad or tablet 12 of my prior invention is of intersecting grid design 21 with tray posts 22 and tray stop 23. Pad 12 possesses a pad lip around its perimeter for support on the perimeter of tray 13; and also pad "buttons" for support on tray posts 22. Drawer tray 13 also preferably possesses a handle end 26a with "finger" slots 26 (FIG. 5) for gripping the tray for periodic removal as desired. Urine collector tray 60 of this invention may be similarly constructed with such a handle, etc.

As previously stated, the trays of this invention may be constructed with slots and locking tabs and other locking members such as may be employed in connection with any of the various tray members to enable or facilitate their easy assemblage and/or disassembly, but should not be construed as limiting as to means which may be employed for such functions.

Upper compartment 2 also preferably possesses user friendly "finger pads" located near the unlocking levers and stiffening webs to facilitate ease of assembly and disassembly of the compartments 2 and 3 with or from each other.

The aeration of the entire bottom of the feline waste container of the invention of my prior application is designed for the express purpose of not only eliminating odor but to dry the urine and in doing so to provide a higher degree of sanitation than any other similar system. The aeration even dries the bottom of the top compartment tray which contains the particulate material that the feline frequently scratches for burial of the fecal waste, thus allowing air to rise through the sand or other granular material contained therein. The system thus allows both top and bottom air movement to be absorbed on the floor of any home by simple drafts of heating, air conditioning or body movement.

As previously indicated, the design of FIG. 1 is a preferred embodiment over that of FIG. 3, al though both designs are operative and novel with my previous invention.

The bottom of the upper tray compartment of FIG. 1 and FIG. 6 is designed so as to keep a layer of granules covering the escape urine longitudinal slot holes 44 in the valleys of the tray compartment. The bottom of the tray consists of a number of longitudinal V-shaped valleys and inverted V-shaped bars joined by bar separators 43. The number of these longitudinal V-shaped valleys and inverted V-shaped bars is variable but typically may be a total of about fourteen of each for a waste assembly system having the dimensions previously referred to. This preferred structure keeps the felines from reaching the bottom of the upper tray compartment through the granules and minimizes the catching of their claws on or in the slot holes 44. Because of this "V" and inverted V configuration of the bottom and the inability of the granular material (of appropriate size so as to provide channeling of the urine through same) the V configuration allows for the granular material to protect the holes from being blocked on the urine's route to the tablet in the lower tray assembly in the prior application, or to the urine collection tray in the present application.

FIG. 6 illustrates about seven to nine longitudinal slot holes 44 in each of the V-shaped valleys shown in the bottom of the tray. Typically, any such top tray compartment of a waste elimination system having a top tray compartment design of my prior application or of this invention as illustrated in FIGS. 1 and 6 will have at least a set of sixty or more such elongated holes in the bottom thereof.

In FIG. 7, the number 60 designates the urine collection tray employed in the present invention. Number 61 designates the vertical leg or border employed around the periphery of the tray, numeral 62 the sloped floor section of the tray, and numeral 63 the hole in the center of the tray.

FIG. 8 illustrates the tray in cross-section as employed with the cat waste elimination tray of FIG. 1. The cat's urine passes through granular material 16, goes through openings 44 in the bottom of the cat waste box 5 and flows downwardly on the sloped floor section 62 into hole 63 and then into specimen cup 64.

Figure 9:
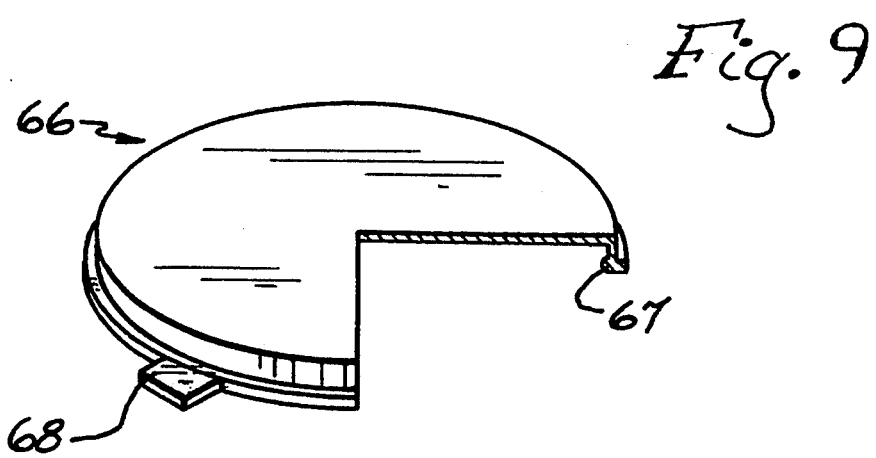
FIG. 9 is a perspective view (partial) of a lid for the cup.
Figure 10:
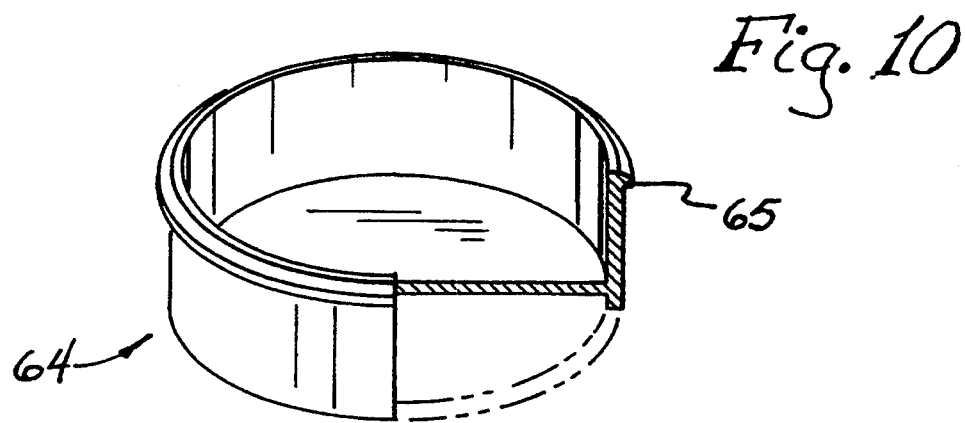
FIG. 10 is a perspective view of the urine collection cup employed in the present invention.

Specimen cup 64 is shown in more detail in FIG. 10 with a locking lug or border 65 around its periphery at the top. A cover 66 for the cup is shown in FIG. 9, which cover or lid possesses a locking lug 67 around its periphery to engage under lug 65 of the cup so as to facilitate the transportability of the cup without spillage. The top also preferably possesses a pull or lift tab 68 to assist in disengaging the lid from the cup.

The foregoing description and embodiments are intended to illustrate the invention without limiting it thereby. It will be understood that various modifications can be made in the invention without departing from the spirit or scope thereof.

I claim:

1. A urine collection device to assist in the maintenance and monitoring of the health of pets through urine analysis comprising in combination:
   a. a substantially rectangular top tray compartment;
   b. a substantially rectangular bottom tray assembly; and
   c. a urine collection tray interposed horizontally parallel between said top tray compartment and bottom tray assembly and extending longitudinally and transversely therebetween suspended in the bottom tray assembly, said urine collection tray having a hole located at approximately its center; and
   d. a urine collection cup located under the hole in the collection tray; wherein said top tray compartment possesses a screen in the bottom thereof parallel to and above the urine collection tray for supporting a particulate material is which the cat's waste is deposited and through which screen and particulate material the cat's urine passes for deposit upon the urine collection tray; and wherein said bottom tray assembly posses aeration openings in its sides and at least one of its ends to assist in evaporation of the excess urine deposited upon the particulate material contained in said top tray compartment.

2. A urine collection device according to claim 1 wherein the urine collection tray possesses a floor which slopes toward its center hole.

3. A urine collection device according to claim 1 including a locking engaging lid for the cup.

4. A urine collection device to assist in the maintenance and monitoring of the health of pets through urine analysis comprising in combination:
   a. a substantially rectangular top tray compartment;
   b. a substantially rectangular bottom tray assembly;
   c. a urine collection tray interposed horizontally parallel between said top tray and bottom tray assembly and extending longitudinally and transversely therebetween suspended in the bottom tray assembly, said urine collection tray having a hole located approximately at its center; and
   d. a urine collection cup located under the hole in the collection tray; wherein said top tray compartment possesses a set of at least 60 elongated holes in the bottom thereof parallel to and above the urine collection tray for supporting a particulate material in which the cat's waste is deposited and through which holes and particulate material the cat's urine passes for deposit upon the urine collection tray; and said bottom tray assembly possesses aeration openings in its sides and at least one of its ends to assist in evaporation of the excess cat's urine deposited upon the particulate material contained in said top tray compartment.

5. A urine collection device according to claim 4 wherein the urine collection tray possesses a floor which slopes toward its center hole.

6. A urine collection device according to claim 4 including a locking engaging lid for the cup.

7. A urine collection device to assist in the maintenance and the monitoring of the health of pets through urine analysis which device is comprised of in combination:
   a. a substantially rectangular top tray compartment with a pervious bottom, said compartment being about 14 inches wide, about 20 to 22 inches long and about 5½ inches deep;
   b. a substantially rectangular bottom compartment assembly having upper and lower sections containing a multiplicity of aeration openings which match up vertically;
   c. a urine collection tray interposed horizontally parallel between said top tray compartment and bottom tray assembly and extending longitudinally and transversely therebetween suspended in the bottom tray assembly, said urine collection tray having a hole located approximately at its center; and
   d. a urine collection cup located under the hole in the collection tray.

8. A urine collection device according to claim 7 wherein the urine collection tray possesses a floor which slopes toward its center hole.

9. A urine collection device according to claim 7 wherein said top tray compartment possesses a bottom configuration consisting of a multiplicity of V-shaped valleys and inverted V-shaped hills, the bottom of said valleys possessing a multiplicity of longitudinal holes, said bottom capable of supporting a particulate material in which the pet's waste is to be deposited, the longitudinal holes in the bottom valleys being of sufficient number and size to permit passage therethrough of the pet's urine but also being sufficiently limited in size so as toe capable of supporting most or substantially all of the particulate material which is to be placed atop same without permitting passage through the holes of said valleys.

* * * * *